US012527712B2

(12) United States Patent
Kang et al.

(10) Patent No.: US 12,527,712 B2
(45) Date of Patent: Jan. 20, 2026

(54) MASSAGE DEVICE COMPRISING ROTATABLE ARM MASSAGE UNIT

(71) Applicant: BODYFRIEND CO., LTD., Seoul (KR)

(72) Inventors: Woong Chul Kang, Seoul (KR); Il Soo Yeom, Seoul (KR); Ju Song Hur, Seoul (KR); Beom Seok Lee, Seoul (KR)

(73) Assignee: BODYFRIEND CO., LTD., Seoul (KR)

( * ) Notice: Subject to any disclaimer, the term of this patent is extended or adjusted under 35 U.S.C. 154(b) by 483 days.

(21) Appl. No.: 18/016,174

(22) PCT Filed: Jul. 13, 2021

(86) PCT No.: PCT/KR2021/008935
§ 371 (c)(1),
(2) Date: Jan. 13, 2023

(87) PCT Pub. No.: WO2022/015002
PCT Pub. Date: Jan. 20, 2022

(65) Prior Publication Data

US 2023/0310254 A1 Oct. 5, 2023

(30) Foreign Application Priority Data

Jul. 15, 2020 (KR) ........................ 10-2020-0087466
Jun. 29, 2021 (KR) ........................ 10-2021-0085015

(51) Int. Cl.
*A61H 7/00* (2006.01)

(52) U.S. Cl.
CPC ....... *A61H 7/007* (2013.01); *A61H 2007/009* (2013.01); *A61H 2201/0149* (2013.01); *A61H 2201/1635* (2013.01)

(58) Field of Classification Search
CPC ...................................................... A61H 7/007
See application file for complete search history.

(56) References Cited

U.S. PATENT DOCUMENTS

2005/0146176 A1* 7/2005 Yoda .................... A61H 9/0071 297/217.1
2006/0142676 A1* 6/2006 Fujii ...................... A61H 7/007 601/99

(Continued)

FOREIGN PATENT DOCUMENTS

JP 2008-509790 A 4/2008
JP 2008-178491 A 8/2008

(Continued)

*Primary Examiner* — Justine R Yu
(74) *Attorney, Agent, or Firm* — Bridgeway IP Law Group, PLLC; Sang Ho Lee; Hyun Woo Shin

(57) ABSTRACT

Provided is a massage device including a rotatable arm massage unit and, particularly, to a massage device having a rotatable arm massage unit to provide various functions to a user. To this end, an aspect of the present invention may include: a body massage unit which accommodates at least a part of a user's body and massages the user's body; and a pair of arm massage units which are arranged at opposite sides of the body massage unit to respectively accommodate both arms of the user and massage the arms of the user, wherein the body massage unit includes a main frame including arm frames to which the respective arm massage units are connected, and the arm massage units can rotate in at least one direction.

7 Claims, 13 Drawing Sheets

(56) References Cited

U.S. PATENT DOCUMENTS

| | | | | |
|---|---|---|---|---|
| 2007/0106186 | A1* | 5/2007 | Baek | A61H 9/0078 601/149 |
| 2011/0015554 | A1* | 1/2011 | Morikawa | A61H 9/0078 601/84 |
| 2013/0172792 | A1* | 7/2013 | Tao | A61H 7/004 601/116 |
| 2018/0168914 | A1* | 6/2018 | Inada | H04L 67/12 |
| 2022/0183923 | A1* | 6/2022 | Okamoto | A61H 9/0078 |

FOREIGN PATENT DOCUMENTS

| | | | |
|---|---|---|---|
| JP | 4249559 | B2 | 4/2009 |
| KR | 10-2018-0083118 | A | 7/2018 |
| KR | 10-2018-0128240 | A | 12/2018 |
| KR | 10-2056540 | B1 | 1/2020 |

* cited by examiner

MASSAGE DEVICE COMPRISING ROTATABLE ARM MASSAGE UNIT

TECHNICAL FIELD

The present invention relates to a massage device comprising a rotatable arm massage unit, and more particularly, to a massage device capable of providing various functions to a user by including a rotatable arm massage unit.

BACKGROUND ART

Massage is a medical assistance therapy for controlling a user's physical modulation, helping blood circulation, and relieving fatigue of the user by applying various types of mechanical stimulation to a portion of the body, such as massaging, pressing, pulling, tapping, or moving a portion of the body of the user.

The growth in a massage demand caused an increase in demand for massage devices or massage devices, which provide an artificial massage function, because of economic feasibility and temporal reasons. That is, as the demand for relieving fatigue or stress is increased while loosening the agglomerated muscles through massage, various mechanical massage devices for time and cost efficiencies are being released.

Recently, there is an increase in interest in health of people, and the massage device is changing as an electronic device providing various additional functions, and/or medical functions from a device simply providing a massage function. Accordingly, researches on how to efficiently control a massage device are continued.

In particular, since users may have different regions to get a massage and may be different in desired stimulation from one another, the demands of users for apparatuses and methods providing a massage optimized for each user are increasing.

DISCLOSURE

Technical Problem

An object of the present invention is to provide a massage device including a rotatable arm massage unit to provide various functions to a user.

Another object of the present invention is to provide a massage device providing various massage functions and stretching functions to the user's arm by rotating an arm massage unit up and down or left and right.

The objects of the present invention are not limited to the above-mentioned effects, and other effects, which are not specifically mentioned herein, will be clearly understood by those skilled in the art from the following description.

Technical Solution

To accomplish the above-mentioned objects, according to the present invention, there is provided a massage device including: a body massage unit accommodating at least a portion of the body of a user to massage the user's body; and a pair of arm massage units which are respectively arranged at both sides of the body massage unit and respectively accommodate both arms of the user to massage the user's arms, wherein the body massage unit includes a main frame including arm frames to which the arm massage units are respectively connected, and each of the arm massage units is rotatable in at least one direction.

Moreover, the massage device further includes a rotation module for rotating the arm massage unit in at least one direction.

Furthermore, the rotation module includes a first rotation module for rotating the arm massage unit in a vertical direction.

Additionally, the first rotation module comprises a first rotation sensor for measuring the degree of vertical rotation of the arm massage unit.

In addition, the rotation module includes a second rotation module for rotating the arm massage unit in a horizontal direction.

Moreover, the second rotation module comprises a second rotation sensor for measuring the degree of horizontal rotation of the arm massage unit.

Furthermore, the massage device further includes a height adjustment module for adjusting a height of the rotation module.

Additionally, the height adjustment module moves the rotation module in a direction parallel to the longitudinal direction ranging from the user's shoulder to the user's elbow.

In addition, the rotation modules are respectively disposed at both sides of the body massage unit to correspond to the pair of arm massage units.

Furthermore, the rotation modules move independently of each other.

Advantageous Effects

According to the present invention, it is possible to provide a massage device capable of providing various functions to a user.

In addition, according to the present invention, it is possible to provide a massage device capable of providing various massage functions and stretching functions to the user's arm by rotating an arm massage unit up and down or left and right.

The effects of the present invention are not limited to the above-mentioned effects, and other effects, which are not specifically mentioned herein, will be clearly understood by those skilled in the art from the following description.

BEST MODE

Figure 1:
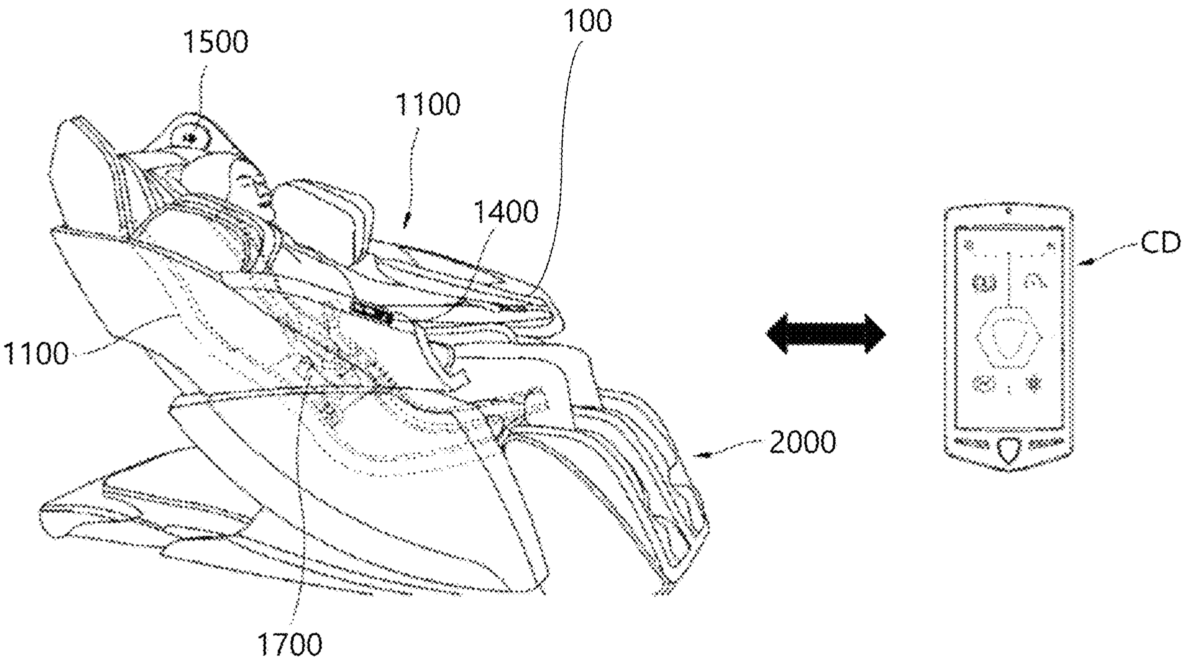
FIG. 1 is a view illustrating a massage device according to an embodiment of the present invention.

There is a massage device including: a body massage unit accommodating at least a portion of the body of a user to massage the user's body; and a pair of arm massage units which are respectively arranged at both sides of the body massage unit and respectively accommodate both arms of the user to massage the user's arms, wherein the body massage unit includes a main frame including arm frames to which the arm massage units are respectively connected, and each of the arm massage units is rotatable in at least one direction.

MODE FOR INVENTION

The objects, features, and advantages of the present invention described above will become more apparent through the following embodiments in connection with the accompanying drawings. The following specific structure to functional descriptions are illustrated for the purpose of describing an embodiment according to the concept of the present invention, and embodiments according to the concept of the present invention may be implemented in various forms and should not be construed as being limited to the embodiments described herein or the application.

The embodiments according to the concepts of the present invention may apply various changes and may have various forms, and thus certain embodiments are illustrated in the drawings and will be described in detail in the specification or application. However, it should be understood that the embodiments of the present invention are not intended to limit the embodiments of the present invention to a specific disclosure, and include all modifications, equivalents, and replacements included in the spirit and technical scope of the present invention.

Terms such as first and/or second may be used to describe various components, but the components are not limited to the terms. The terms are only for the purpose of distinguishing one component from other components, for example, without departing from the scope of the present invention, a first component may be referred to as a second component, and similarly, a second component may also be referred to as a first component.

It should be understood that when a component is referred to as being "connected" or "coupled" to another component, it may be directly connected or coupled to the other component, but it should be understood that there may be other components therebetween. On the other hand, when a component is referred to as being "directly connected" or "directly coupled" to another component, it should be understood that there is no other component therebetween. Other expressions for describing the relations between the components, that is, the expression "between" and "directly between" or "adjacent to" and "directly adjacent to" should be interpreted in the same manner.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

In this specification, an actuator means a component capable of providing a driving force. For instance, the actuator may be a motor, a linear motor, an electronic motor, a DC motor, an AC motor, a linear actuator, an electric actuator, or the like, but is not limited thereto.

In this specification, a binaural beat may refer to audio information of a specific form capable of adjusting brainwaves.

In this specification, according to an embodiment, the massage device may include a body massage unit and a leg massage unit. In addition, according to another embodiment, the body massage unit and the leg massage unit may be provided as separate devices (for example, a body massage device and a leg massage device), and the massage device may refer to a body massage device or a leg massage device.

Hereinafter, embodiments of the present invention will be described in more detail with reference to the accompanying drawings.

FIG. 1 is a view illustrating a massage device 100 according to an embodiment of the present invention.

The massage device 100 according to an embodiment of the present invention may include a body massage unit 1000 having an area for accommodating at least a portion of the body of a user to massage the user's body, and a leg massage unit 2000 to massage the user's legs.

The body massage unit 1000 may provide a massage to at least a portion of the body of the user. The body massage unit 1000 may include a massage module 1700 providing a massage function to at least a portion of the body of the user, an audio output module 1500 for providing an audio output of an arbitrary form to the user, a main frame 1100 forming a framework of the body massage unit 1000, and a user input unit 1400 for receiving an input of an arbitrary form from the user.

The components included in the body massage unit 1000 described above are merely exemplary embodiments, and the body massage unit 1000 may include various configurations in addition to the above-described configuration.

In addition, the shape and the structure of the massage device 100 illustrated in FIG. 1 are merely exemplary, and various types of massage devices 100 may also be included within the scope of the present invention unless departing from the scope of the present invention defined by the claims of the present invention.

The body massage unit 1000 may have a space of any form for accommodating a user. The body massage unit 1000 may have a space corresponding to the body shape of the user. For example, as illustrated in FIG. 1, the body massage unit 1000 may be realized as a seating type capable of accommodating the whole body or a portion of the body of the user.

A portion of the body massage unit 1000 which gets in contact with the ground may include any material for increasing a frictional force or any member (for example, an anti-slip pad or the like) for increasing a frictional force, and may include wheels for enhancing mobility of the massage device 100.

At least a portion of the body massage unit 1000 may slide. For example, when the body massage unit 1000 starts a massage, at least a portion of the body massage unit 1000 may slide forward. Furthermore, the body massage unit 1000 may be tilted backward. As a result, the body massage unit 1000 may provide a massage while being inclined backward.

According to an embodiment of the present invention, the massage device 100 may include at least one air cell (not illustrated). The air cell may be located at a shoulder portion of the user, a pelvis portion, an arm massage unit, a leg massage unit 2000, and the like, but is not limited thereto and may be disposed in various portions of the massage device 100.

The massage device 100 may include an air supply unit, and the air supply unit may inflate the air cell when air is supplied to the air cell. The air supply unit may be located inside the body massage unit 1000 or may be located in the leg massage unit 2000. Alternatively, the air supply unit may be located outside the massage device 100.

The leg massage unit 2000 may provide the user with a leg massage. For example, the leg massage unit 2000 may include a calf massage unit for massaging the user's calf and/or a foot massage unit for massaging the user's foot.

The leg massage unit 2000 may adjust the length according to the body characteristics of the user. For example, in a case in which a user who is tall uses the massage device 100, it is necessary to lengthen the leg massage unit 2000 since the user has long calves. Moreover, in a case in which a user who is short uses the massage device 100, it is necessary to shorten the leg massage unit 2000 since the user has short calves.

The massage module 1700 may be provided inside the body massage unit 1000 to provide any type of mechanical stimulation to the user accommodated in the body massage unit 1000. As illustrated in FIG. 1, the massage module 1700 may move along the main frame 1100 provided inside the body massage unit 1000.

For example, a rack gear may be provided in the main frame 1100 of the body massage unit 1000, and the massage module 1700 may provide dynamic stimulation to various portions of the body of the user while moving along the rack gear 1111. The massage module 1700 may include a ball massage unit or a roller massage unit, but is not limited thereto.

The main frame 1100 constitutes a frame of an internal configuration of the body massage unit 1000, and may be formed of a metal material, a plastic material, or the like. For example, the main frame 1100 may be made of iron, an alloy, steel, or the like, but is not limited thereto, and may be made of various rigid materials.

According to an embodiment of the present invention, the massage device 100 may include an audio output module 1500. The audio output module 1500 may be provided at various positions. For example, the audio output module 1500 may include a plurality of output units, such as an upper audio output unit disposed on an upper end of a seat portion getting in contact with a user, a front audio output unit attached to a front end of the arm massage unit of the right and left sides of the seat portion, and/or a rear audio output unit attached to a rear end of the arm massage unit, but is not limited thereto. In this case, the audio output module 1500 may provide a stereoscopic sound, such as a 5.1 channel sound, but is not limited thereto.

According to an embodiment of the present invention, the user may control the massage device 100 by using a massage device control device CD. The massage device control device CD may be connected to the massage device 100 through wired communication and/or wireless communication.

The massage device control device CD may include a remote controller, a cellular phone, a personal digital assistant (PDA), or the like, and may include various electronic devices connectable to the massage device 100 through wired or wireless communication.

Figure 2:
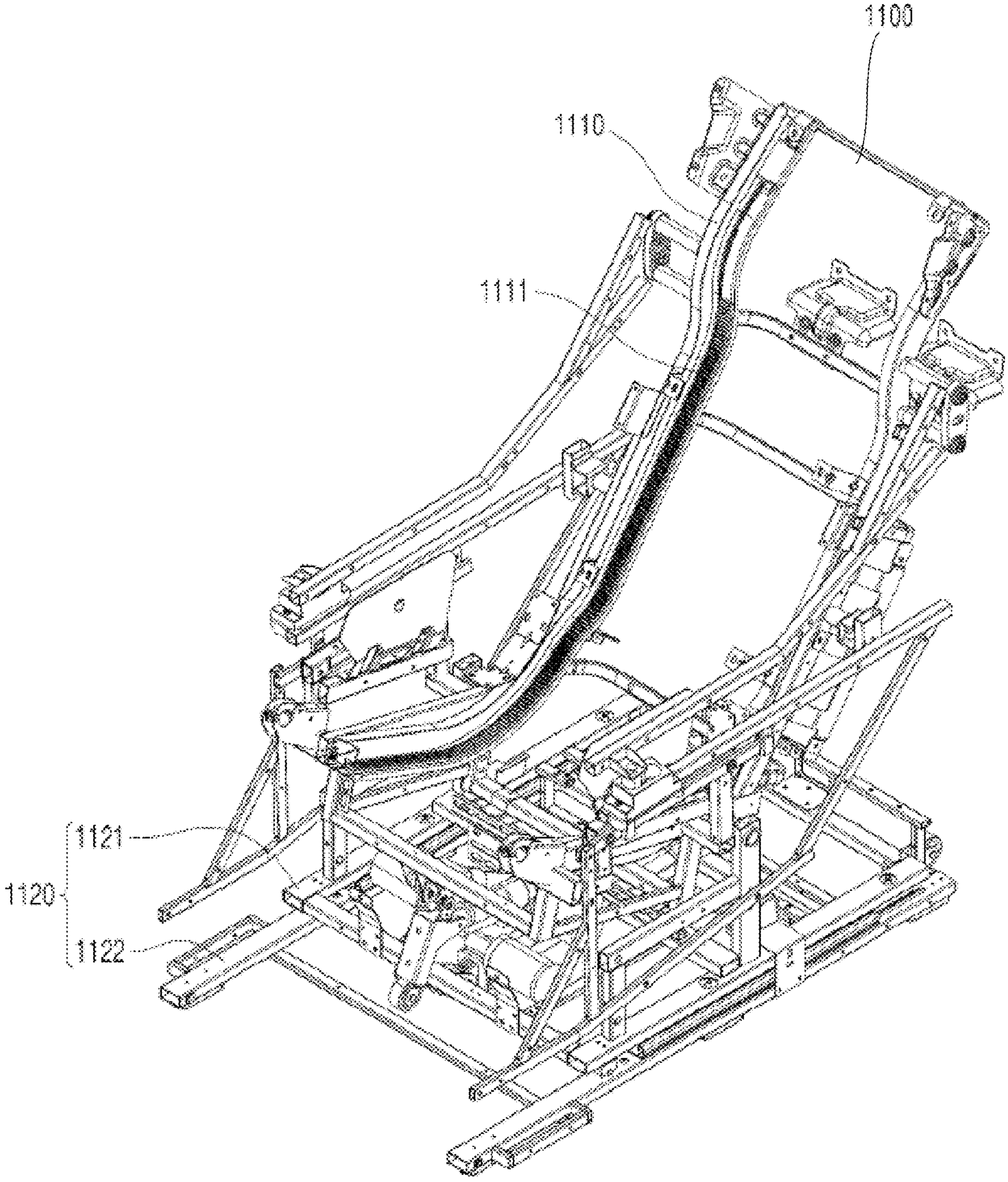
FIG. 2 is a view illustrating a main frame of FIG. 1.
Figure 3:
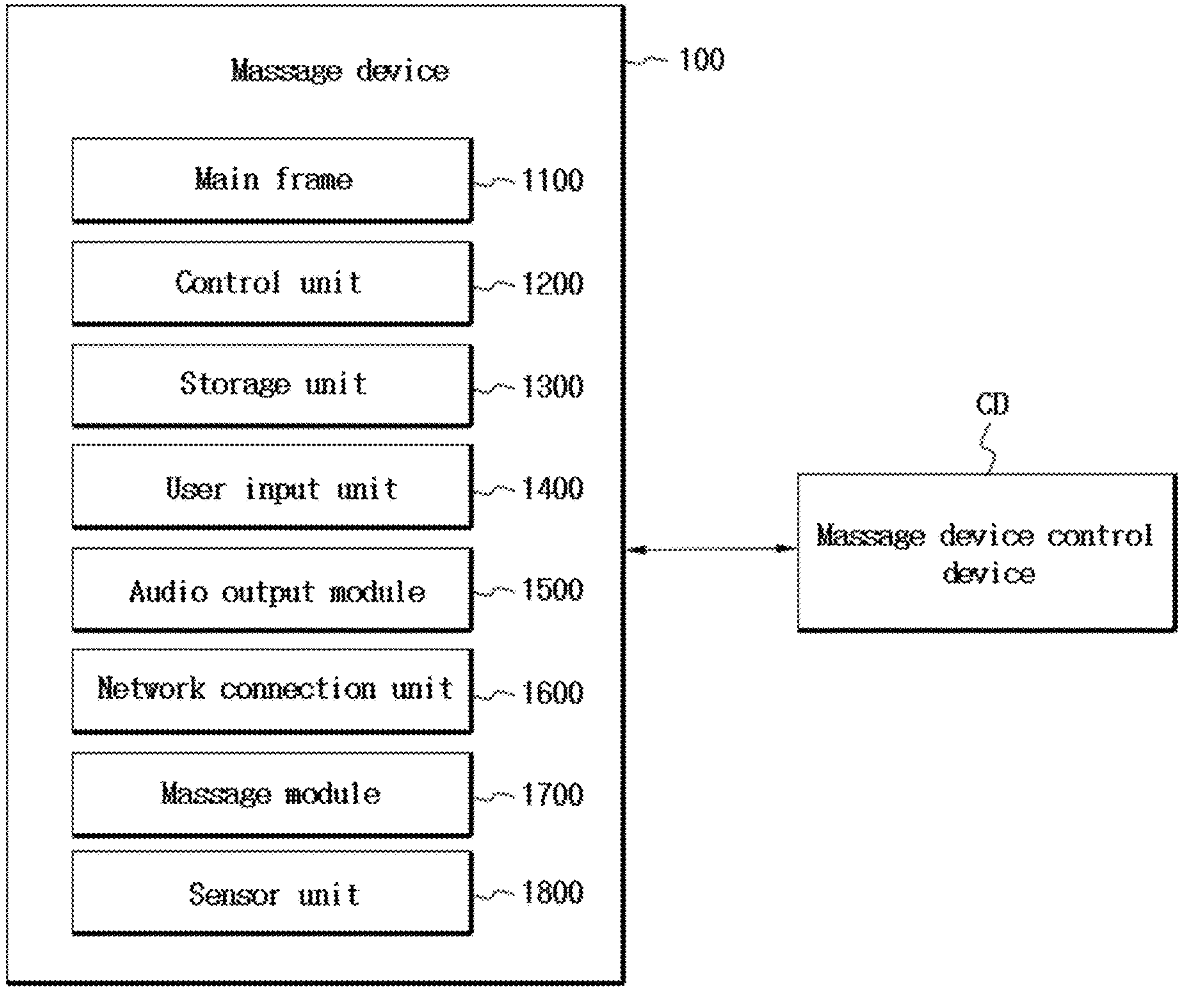
FIG. 3 is a view for depicting components of a massage device according to an embodiment of the present invention.

FIG. 2 is a view illustrating a main frame of FIG. 1, and FIG. 3 is a view for depicting components of the massage device according to an embodiment.

According to an embodiment of the present invention, the massage device 100 may include at least one among a main frame 1100, a control unit 1200, a storage unit 1300, a user input unit 1400, an audio output module 1500, a network connection unit 1600, and a massage module 1700.

The main frame 1100 may form a frame of the body massage unit 1000.

According to an embodiment of the present invention, the main frame 1100 may include an upper frame 1110 provided with the massage module 1700 and a base frame 1120 supporting the upper frame 1110.

A rack gear 1111 may be provided on at least a portion of the upper frame 1110. The rack gear 1111 is a member for guiding a vertical movement of the body massage module 1700, and may include a plurality of valleys and a plurality of crests.

According to an embodiment of the present invention, the rack gears 1111 may be provided at both sides of the upper frame 1110 to face each other, and the body massage module 1700 may move along the rack gears 1111.

For example, the body massage module 1700 may include a gear engaged with the rack gear 1111, and the gear is rotated by an actuator provided in the body massage module 1700, so that the body massage module 1700 may move upward or downward.

The rack gear 1111 may be formed of a metal material or a plastic material. For example, the rack gear 1111 may be made of iron, steel, an alloy, a reinforced plastic, a melamine resin, a phenol resin, or the like, but is not limited thereto.

The upper frame 2230 may be realized in various shapes. For example, the upper frame 2230 may be one selected among an S frame, an L frame, an S&L frame, and a double S&L frame according to the shape of the upper frame, but is not limited thereto.

The S frame refers to a frame in which at least a portion of the upper frame 2230 has a curved shape like "S". The L frame refers to a frame in which at least a portion of the upper frame 2230 is bent like "L", the S&L frame refers to a frame having both of the curved shape like "S" and the bent shape like "L", and the double S&L frame refers to a frame having the curved shape like "L" and the curved shape like "S" formed at two portions.

The base frame 1120 supports the upper frame 1110 of the main frame 1100 and gets in contact with the ground. The base frame 1120 may include a base upper frame 1121 and a base lower frame 1122.

The base upper frame 1121 may support the upper frame 1110, and the base lower frame 1122 may be in contact with the ground. In addition, the base upper frame 1121 may be positioned to be in contact with the base lower frame 1122.

According to an embodiment of the present invention, the base upper frame 1121 may move along the base lower frame 1122. For example, the base upper frame 1121 may slide forward or backward along the base lower frame 1122. In this case, the upper frame 1110 may be connected to the base upper frame 1121 to move according to the movement of the base upper frame 1121.

For example, in a case in which the base upper frame 1121 moves forward, the upper frame 1110 may also move forward, and in a case in which the base upper frame 1121 moves backward, the upper frame 1110 may also move backward. Accordingly, the sliding movement of the body massage unit 1000 may be allowed.

Specifically, in order to allow movement of the base upper frame 1121, a moving wheel may be provided beneath the base upper frame 1121. In addition, a guide member capable of guiding the moving wheel may be provided on an upper portion of the base lower frame 1122. The moving wheel provided beneath the base upper frame 1121 moves along the guide member provided on the base lower frame 1122, thereby allowing forward movement or backward movement of the base upper frame 1121.

According to another embodiment of the present invention, the massage device 100 may not provide a sliding function, and in this case, the base frame 1120 may not be divided into an upper frame and a lower frame.

The control unit 1200 may control the operation of the massage device 100. The control unit 1200 may be implemented as one processor or may be implemented as a plurality of processors. In a case in which the control unit 1200 is realized as a plurality of processors, at least a portion of the plural processors may be physically spaced apart from each other. In addition, the massage device 100 is not limited thereto, and may be implemented in various ways.

For instance, the control unit 120 may correspond to one or more processors. The processor may be implemented as arrays of plural logic gates, or may be implemented as a combination of a general-purpose microprocessor and a memory in which programs executable in the microprocessor are stored. Furthermore, it would be understood by those skilled in the art that the control unit may be implemented as another type of hardware.

According to an embodiment of the present invention, the control unit 1200 may control the operation of the massage device 100. For example, the massage device 100 may include a plurality of actuators. The massage device 100 may control the operation of the massage device 100 by controlling the operation of the plurality of actuators. For example, the massage device 100 may include at least one among a massage module moving actuator, at least one actuator included in the massage module 1700, a back angle actuator, a leg angle actuator, a foot massage actuator, a leg length adjusting actuator, and a sliding actuator, and the control unit 1200 may control the operation of the massage device 100 by controlling them.

The massage module moving actuator is an actuator that enables vertical movement of the massage module 1700, and the massage module 1700 may move along the rack gear by the operation of the massage module moving actuator.

The back angle actuator is an actuator that adjusts an angle of a portion where the back of the user gets in contact with the massage device 100, and the back angle of the massage device 100 may be adjusted by the operation of the back angle actuator.

The leg angle actuator is an actuator for adjusting an angle of the leg massage unit 2000 of the massage device 100. An angle between the leg massage unit 2000 and the body massage unit 1000 may be adjusted by the operation of the leg angle actuator.

The foot massage actuator is an actuator that operates the foot massage module included in the leg massage unit 2000. The massage device 100 may provide a foot massage to the user utilizing the foot massage actuator.

The massage module 1700 may include at least one actuator, and the control unit 1200 may operate at least one actuator to provide various massage motions. For example, the control unit 1200 may operate at least one actuator included in the massage module 1700 to provide a tapping massage, a kneading massage, and the like, and may provide various massage operations without being limited thereto.

The leg length adjusting actuator represents an actuator that adjusts the length of the leg massage unit 2000. For example, the control unit 1200 may adjust the length of the leg massage unit 2000 to be suitable for the user by utilizing the leg length adjusting actuator, and as a result, the user may receive a massage suitable for the user's body shape.

The sliding actuator enables a sliding motion of the massage device 100. For example, a horizontal base upper frame may move forward or backward by the operation of the sliding actuator, and as a result, the upper frame connected to the horizontal base upper frame may also move forward or backward.

The storage unit 1300 may store various pieces of information related to the massage device 100. For example, the storage unit 1300 may include massage control information and personal authentication information, but is not limited thereto.

The storage unit 1300 may be implemented through a non-volatile storage medium capable of continuously storing arbitrary data. For example, the storage unit 1300 may include not only a disk, an optical disk, and a magneto-optical storage device, but also a storage device based on a flash memory and/or a battery-backup memory, but is not limited thereto.

In addition, the storage unit 1300 may include a memory. The memory may be a primary storage device, to which a processor directly accesses, like a random access memory (RAM), such as a dynamic random access memory (DRAM), a static random access memory (SRAM), or the like. The memory may mean a volatile storage device in which stored information is instantaneously erased when power is turned off, but is not limited thereto. The memory may be operated by the control unit 1200.

The user input unit 1400 may receive a command related to the operation control of the massage device 100 from the user, and the user input unit 1400 may be implemented in various forms. For example, the user input unit 1400 may be provided in the body massage unit 1000, or may be provided in the leg massage unit 2000, but is not limited thereto.

The massage device 100 may receive various commands from the user through the user input unit 1400. For example, the massage device 100 may receive commands related to selection of a massage module, selection of a massage mode, selection of massage intensity, selection of massage time, selection of a massage area, selection of a position and an operation of the body massage unit 1000, selection of power On-Off of the massage device 100, selection of an operation state of a thermal function, selection related to sound reproduction, and the like, but is not limited thereto.

According to another embodiment of the present invention, the user input unit 1400 may include hot key type buttons and/or selection buttons for direction selection, cancellation and input according to preset user setting functions or preset self-setting functions.

The user input unit 1400 may be implemented as a keypad, a dome switch, a (static pressure type/capacitive) touch pad, a jog wheel, a jog switch, or the like, but is not limited thereto. Furthermore, the user input unit 1400 may obtain commands through the utterance of the user based on the voice recognition technology.

According to an embodiment of the present invention, the user input unit 1400 may include a display for displaying an operation situation of the massage device 100 or a current state of the user. In this case, the display may include at least one among a liquid crystal display (LCD), a thin film transistor-liquid crystal display (TFT-LCD), an organic light-emitting diode (OLED) display, a flexible display, and a three-dimensional (3D) display, but is not limited thereto.

The audio output module 1500 may provide a user with an audio output of any form. For example, the audio output module 1500 may output a sound source and/or a binaural beat optimized for a massage pattern provided to the user by the massage device 100, thereby providing a brain stimulation to the user. The audio output module 1500 may output a sound signal received through a network (not illustrated) or stored in an internal/external storage medium (not illustrated). For example, the audio output module 1500 may output a sound source according to the control of the user terminal through a network connection (e.g., Bluetooth connection, etc.) with the user terminal. Additionally, the audio output module 1500 may output a sound signal generated in relation to the operation of the massage device 100.

The massage device 100 according to an embodiment of the present invention may include a network connection unit 1600. The network connection unit 1600 may communicate with a module inside the massage device 100, an external massage device, and/or a user terminal through any type of network. The network connection unit 1600 may include a wired/wireless access module for network access. The wireless access technology may include, for example, wireless LAN (WLAN) (Wi-Fi), wireless broadband (Wibro), world interoperability for microwave access (Wimax), high speed efficient downlink alliance (HSDPA), and the like. The wired access technology may include, for example, digital subscriber line (XDSL), fibers shop to the home (FTTH), power line communication (PLC), and the like. In addition, the network connection unit may include a short-range communication module to transmit and receive data to and from any device/terminal located at a short distance. For example, the short-range communication technology may include Bluetooth, radio frequency identification (RFID), infrared data security association (IrDA), ultra-wideband (UWB), ZigBee, and the like, but is not limited thereto.

As described above, the massage device 100 according to an embodiment of the present invention may include a massage module 1700. That is, the massage module 1700 may provide dynamic stimulation to the user, and the massage module 1700 may move along the main frame 1100.

The massage device 100 according to an embodiment of the present invention may include a main frame 1100. As described above with reference to FIGS. 1 to 3, the main frame 1100 may provide a path through which the massage module 1700 can move.

The control unit 1200 may control the operation of the massage module 1700 to apply mechanical stimulation to the user, thereby providing a massage.

The control unit 1200 may move the massage module 1700 in the X-axis, Y-axis, and Z-axis directions. The control unit 1200 may move massage balls forward on the X-axis, the Y-axis, and the Z-axis or retract the massage balls backward. Alternatively, the control unit 1200 may rotate the massage balls around the X-axis, the Y-axis, and the Z-axis.

The massage device 100 according to an embodiment of the present invention may include a sensor unit 1800. Here, the sensor unit 1800 may include at least one sensor. For example, the sensor unit 1800 may include a pressure sensor, an infrared sensor, an LED sensor, a photo sensor, a hall sensor, a capacitive sensor, and the like, but is not limited thereto.

The sensor unit 1800 may be used to acquire various pieces of information. For example, the sensor unit 1800 may be used to recognize a user. That is, information on whether the user is sitting in the massage device, the body shape of the user, whether there is any abnormality in the user's body, or the like may be obtained. As another example, the sensor unit 1800 may be used to acquire biometric information. That is, fingerprint information, face information, voice information, iris information, weight information, electrocardiogram information, body composition information, and the like may be obtained, but the present invention is not limited thereto, and may include various pieces of biometric information.

According to another embodiment of the present invention, the massage device 100 may sense a contact area and/or a contact position with the user through a sensor unit 1800. Furthermore, the massage device 100 may acquire information on the user's shoulder position through the sensor unit 1800. Moreover, the massage device 100 may provide a customized massage based on the acquired information. For instance, in a case in which the massage device 100 provides a shoulder massage, the massage device 100 may recognize the user's shoulder position based on the acquired information through the sensor unit 1800, and provide a shoulder massage to the user according to the recognition result.

The leg massage unit 2000 may be a component to massage the user's leg. The leg massage unit 2000 may include a leg accommodation space 2100 in which the user's leg is accommodated.

The leg massage unit 2000 may include at least one among an air cell (not illustrated), a calf massage module (not illustrated), and a foot massage unit (not illustrated).

The air cell (not illustrated) may be a component for fixing at least a portion of the body of the user. The air cell included in the leg massage unit 2000 may be a component to expand by receiving air from an air supply unit to fix at least a portion of the body of the user.

The calf massage module (not illustrated) may be a component to massage a calf portion of the accommodated leg of the user. In this instance, the calf massage module may include a ball massage unit or a roller massage unit as described above, but is not limited thereto.

The foot massage unit (not illustrated) may be a component to massage the user's foot. The foot massage unit may include a foot massage module for massaging the user's foot. Here, the foot massage module may include a ball massage unit or a roller massage unit as described above, but is not limited thereto.

Hereinafter, a massage device including a rotatable arm massage unit according to an embodiment of the present invention will be described in detail with reference to the drawings.

Figure 4:
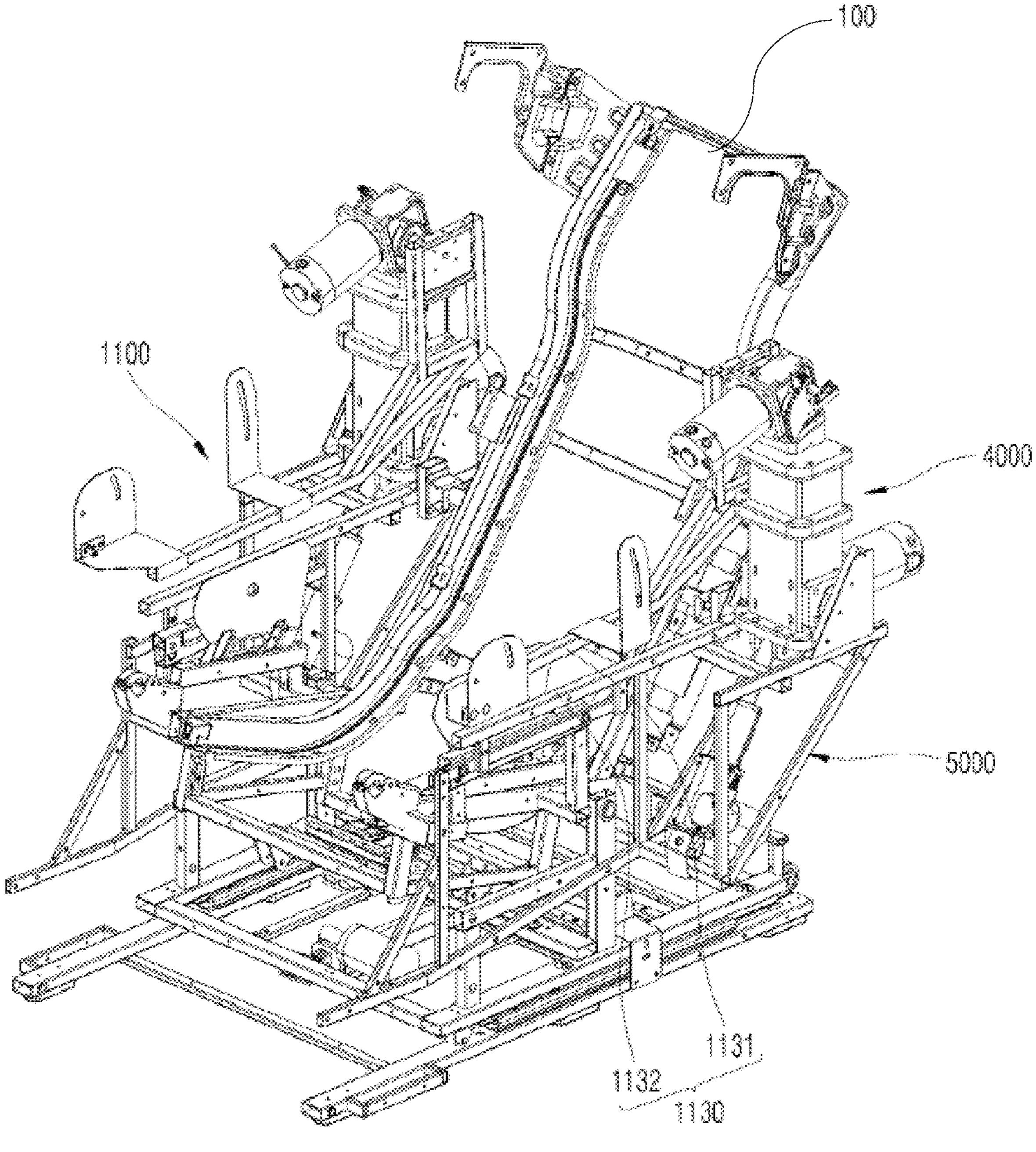
FIG. 4 is a view illustrating an example in which an arm frame and a rotation module are disposed in the main frame of FIG. 2.

FIG. 4 is a view illustrating an example in which an arm frame 1130 and a rotation module 4000 are provided in the main frame 1100 of FIG. 2.

Figure 5:
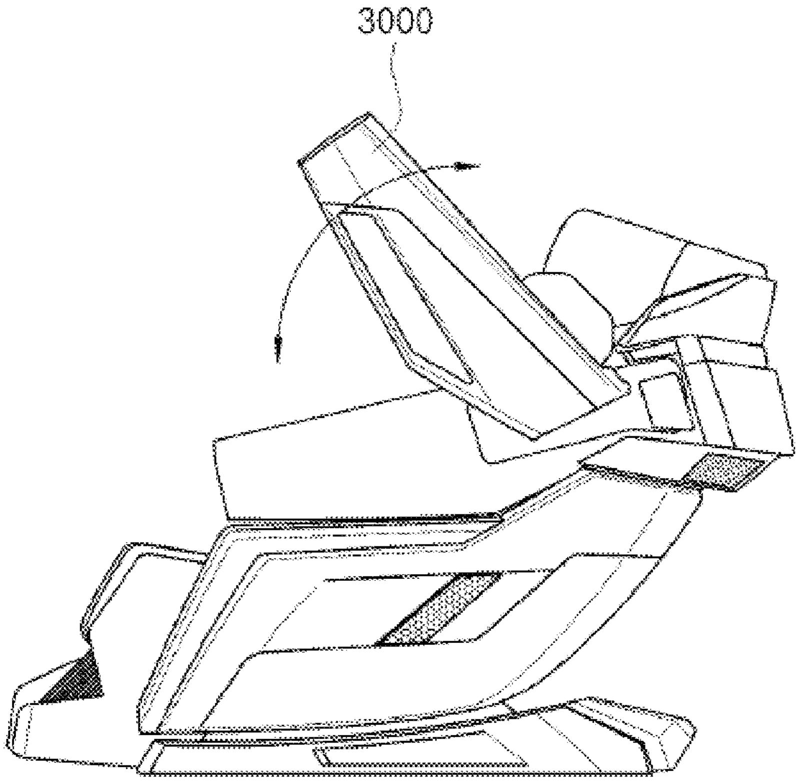
FIG. 5 is a view illustrating that an arm massage unit rotates in one direction.
Figure 6:
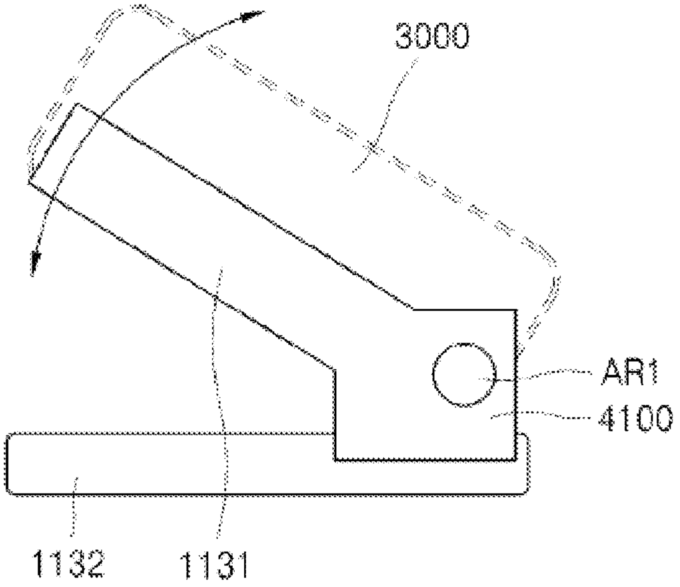
FIG. 6 is a view for depicting a rotation principle of the arm massage unit of FIG. 5.

FIG. 5 is a view illustrating that the arm massage unit 3000 rotates in one direction, and FIG. 6 is a view for depicting the rotation principle of the arm massage unit 3000 of FIG. 5.

Referring to FIGS. 4 and 5, the massage device 100 according to an embodiment of the present invention includes a body massage unit 1000 accommodating at least a portion of the body of the user to massage the user's body, and a pair of arm massage units 3000 disposed at both sides of the body massage unit 1000 to respectively accommodate both arms of the user and massage the arms of the user. The body massage unit 1000 may include a main frame 1100 including an arm frame 1130 to which the arm massage unit 3000 is connected, and the arm massage unit 3000 may be rotatable in at least one direction.

As described above, the body massage unit 1000 may be a means for providing a massage to at least a portion of the body of the user. For example, the body massage unit 1000 may include a space for accommodating at least a portion of the body of the user.

In an embodiment, the accommodation space of the body massage unit 1000 may be a space in which a user sits. That is, the user may sit in the space formed in the body massage unit 1000, and receive a massage in a sitting state.

The main frame 1100 may be a means disposed inside the body massage unit 1000 to form a frame of the body massage unit 1000.

As an alternative embodiment, the body massage unit 1000 may include a cover for covering the massage module 1700 disposed therein so that the massage module 1700 is not exposed to the outside.

As an alternative embodiment, the massage device 100 according to an embodiment of the present invention may further include a leg massage unit 2000. The leg massage unit 2000 may be a means for providing a leg massage to the user. For example, the leg massage unit 2000 may include a calf massage unit for massaging the user's calf and/or a foot massage unit for massaging the user's foot.

The leg massage unit 2000 may include a space for accommodating at least a portion of the leg of the user. The user may insert a leg into the space formed in the leg massage unit 2000 to receive a massage in a state in which the leg is inserted into the leg massage unit 2000.

The arm massage unit 3000 may be a means for massaging or stretching the user's arm. For example, the arm massage unit 3000 may include a massage module 1700 for providing a massage to the user's arm.

Meanwhile, as will be described below, since the arm massage unit 3000 may be rotated in at least one direction to provide stretching, massage, or other medical treatment to the user, it should be understood that providing a massage to the user's arm includes not only simply providing pressing, tapping, and rubbing but also providing stretching and other medical treatment performed by rotating or extending the user's arm in a specific direction.

The arm massage units 3000 may be disposed at both sides of the body massage unit 1000. For example, the arm massage units 3000 may be respectively disposed at positions corresponding to both arms of the user. Each arm massage unit 3000 may include a space for accommodating the user's arm.

In an embodiment, the main frame 1100 may include an arm frame 1130 to which the arm massage unit 3000 is connected. For example, the arm massage units 3000 may be disposed on both side surfaces of the body massage unit 1000. Accordingly, the user may be provided with massage by inserting both arms into the arm massage units 3000 while sitting on the body massage unit 1000.

In an embodiment, the arm massage unit 3000 may be rotatable in at least one direction. Preferably, the arm massage unit 3000 may rotate in the vertical direction and the horizontal direction based on FIG. 4. The massage device 100 according to an embodiment of the present invention may further include a rotation module 4000 for rotating the arm massage unit 3000 in at least one direction. The rotation module 4000 will be described in detail later.

Referring to FIGS. 4 to 6, the arm massage unit 3000 may be rotatable in the vertical direction. For example, the arm massage unit 3000 may rotate in the vertical direction while accommodating the user's arm in a state in which the user sits on the massage device 100.

Accordingly, the arm frame 1130 may include a moving frame 1131 connected to the arm massage unit 3000 to rotate the arm massage unit 3000, and a fixed frame 1132 fixed at a predetermined position not to rotate. In this case, the moving frame 1131 may be connected to the rotation module 4000 to rotate in the vertical direction by driving of the rotation module 4000. Here, the rotation module 4000 may include a first rotation module 4100 that rotates the arm massage unit 3000 in the vertical direction.

As an alternative embodiment, the moving frame 1131 and the fixing frame 1132 may extend toward the front of the user to have a length while the user sits in the massage device 100. Accordingly, even when the arm of the user is put in the arm massage unit 3000, the moving frame 1131 and the fixing frame 1132 can sufficiently withstand the load of the user's arm. In addition, a force generated by the rotation module 4000 can be efficiently transferred to the arm massage unit 3000 to stably rotate the arm massage unit 3000.

As an alternative embodiment, the arm massage units 3000 on both sides may be independently rotatable. For example, in a case in which the arm massage unit 3000 on one side rotates in the vertical direction, the arm massage unit 3000 on the other side may not rotate or may rotate in the horizontal direction. Alternatively, both of the arm massage units 3000 rotating in the vertical direction may be different from each other in angle, strength, and speed. Accordingly, the rotation module 4000 may be disposed at both sides of the body massage unit 1000 to correspond to the pair of arm massage units 3000. In addition, the rotation module 4000 may be controlled independently of each other to independently rotate the arm massage units 3000 on both sides.

Figure 7:
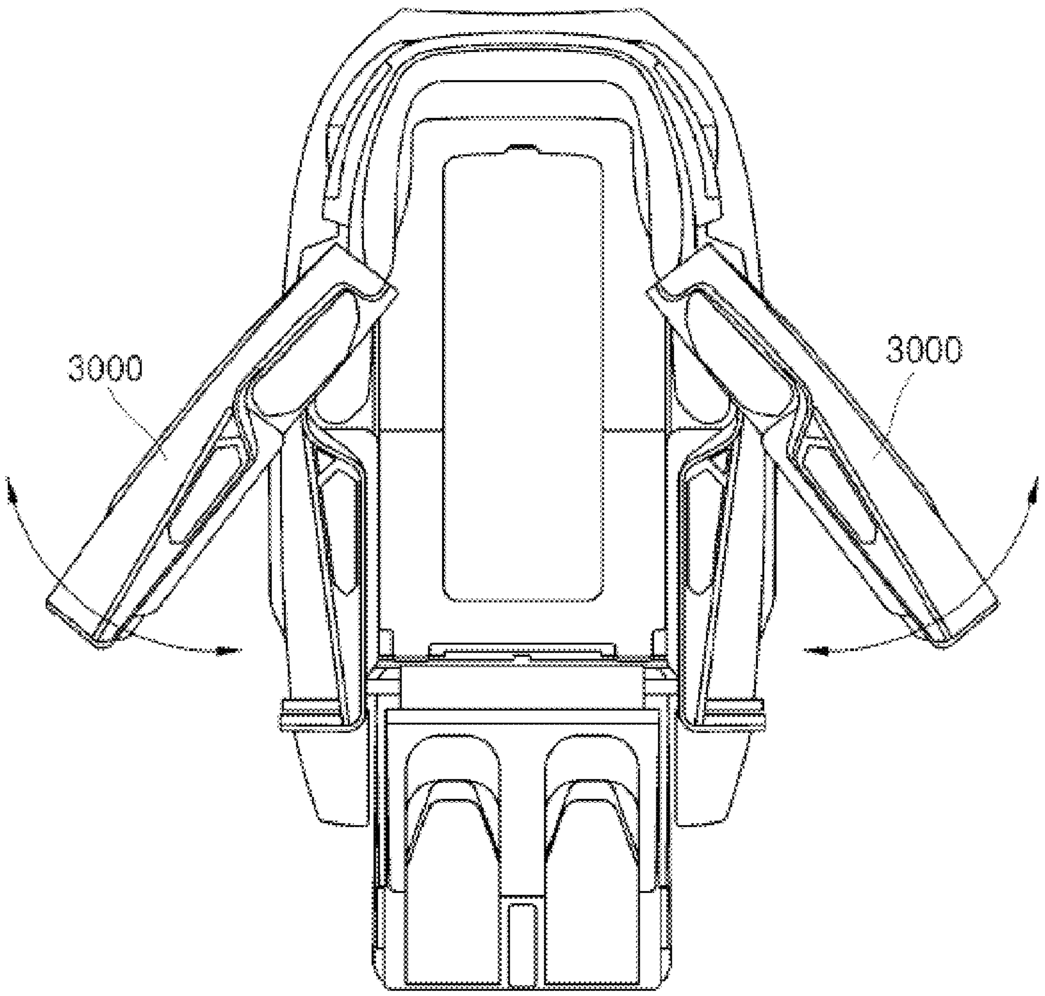
FIG. 7 is a view illustrating that the arm massage unit rotates in a different direction.
Figure 8:
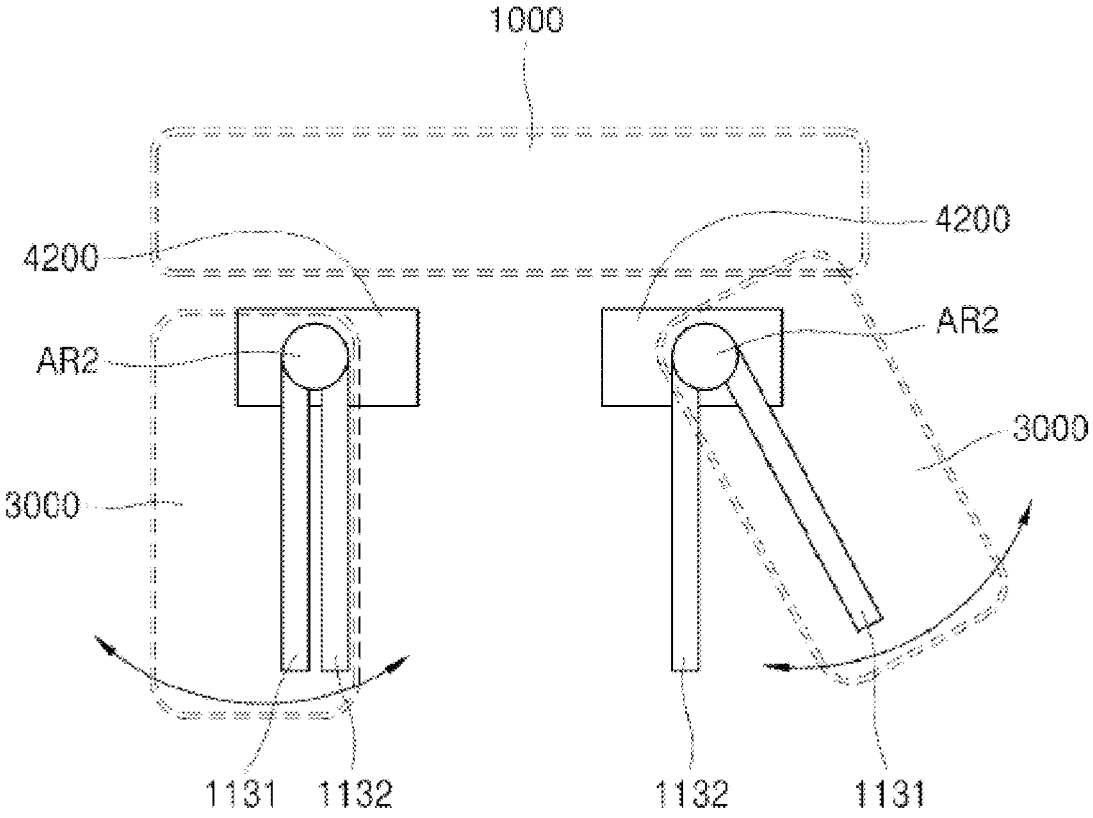
FIG. 8 is a view for depicting a rotation principle of the arm massage unit of FIG. 7.

FIG. 7 is a view illustrating that the arm massage units 3000 rotate in different directions, and FIG. 8 is a view for depicting the rotation principle of the arm massage units 3000 of FIG. 7.

Referring to FIGS. 4, 7, and 8, the arm massage unit 3000 may be rotatable in the horizontal direction. For example, the arm massage unit 3000 may rotate in the horizontal direction while the user's arm is accommodated in the arm massage unit in a state in which the user sits on the massage device 100.

As described above, the arm frame 1130 may include a moving frame 1131 connected to the arm massage unit 3000 to rotate the arm massage unit 3000, and a fixing frame 1132 fixed at a predetermined position. In this case, the moving frame 1131 may be connected to the rotation module 4000 to rotate in the horizontal direction by driving of the rotation module 4000. Here, the rotation module 4000 may include a second rotation module 4200 configured to rotate the arm massage unit 3000 in the horizontal direction.

Furthermore, as described above, the moving frame 1131 and the fixing frame 1132 may extend toward the front of the user to have a length while the user sits in the massage device 100. Accordingly, even when the arm of the user is put in the arm massage unit 3000, the moving frame 1131 and the fixing frame 1132 can sufficiently withstand the load of the user's arm. In addition, a force generated by the rotation module 4000 can be efficiently transferred to the arm massage unit 3000 to stably rotate the arm massage unit 3000.

As an alternative embodiment, the arm massage units 3000 on both sides may be independently rotatable. For example, in a case in which the arm massage unit 3000 on one side rotates in the horizontal direction, the arm massage unit 3000 on the other side may not rotate or may rotate in the vertical direction. Alternatively, both of the arm massage units 3000 rotating in the horizontal direction may be different from each other in angle, strength, and speed. Accordingly, the rotation module 4000 may be disposed at both sides of the body massage unit 1000 to correspond to the pair of arm massage units 3000. In addition, the rotation module 4000 may be controlled independently of each other to independently rotate the arm massage units 3000 on both sides.

As described above, the arm massage unit 3000 may be rotated in the vertical direction or in the horizontal direction to provide a stretching function or a rehabilitation exercise function to the user's arm. For example, the arm massage unit 3000 may provide a stretching function by rotating the user's arm while rotating in the vertical or horizontal direction in a state in which the user's arm is accommodated therein. Alternatively, in a case in which the user is wounded in the arm, the arm massage unit 3000 may provide a rehabilitation function to allow the user to perform a rehabilitation exercise by rotating in a state in which the user's arm is accommodated in the arm massage unit. Alternatively, the arm massage unit may provide an exercise function by rotating by a magnetic force in a state in which the rotation module 4000 is not driven. That is, since the arm massage unit 3000 is configured to rotate in the vertical direction and in the horizontal direction, the user may perform muscular strength exercise by manually rotating the arm massage unit 3000.

As an alternative embodiment, the arm massage units 3000 may further include a load sensor for measuring a load. For example, the load sensor may measure a force applied from the rotation module 4000 to rotate the arm massage unit 3000. In a case in which the force is greater than or equal to a predetermined value, the load sensor may recognize that the user's arm has been rotated as much as a limit value that the user's arm is no longer rotated, and transmit a control signal to the control unit 1200 to stop the rotation of the arm massage unit 3000. In addition, the load sensor may measure a load applied to the arm massage unit 3000 by the user's arm. In a case in which the force is greater than or equal to a predetermined value, the load sensor may recognize that the user intends to manually control the arm massage unit 3000, and transmit a control signal to the control unit 1200 to change the rotation operation of the arm massage unit 3000 into the manual mode.

As another alternative embodiment, the arm massage unit 3000 may further include a jamming prevention sensor for detecting that at least a portion of the body of the user is caught. For example, the jamming prevention sensor may transmit a control signal for stopping the rotation of the arm massage unit 3000 to the control unit 1200 in a case in which the jamming prevention sensor senses that the user's body is caught at a predetermined position while the arm massage unit 3000 rotates. Accordingly, stability of the user's body may be further improved.

Figure 9:
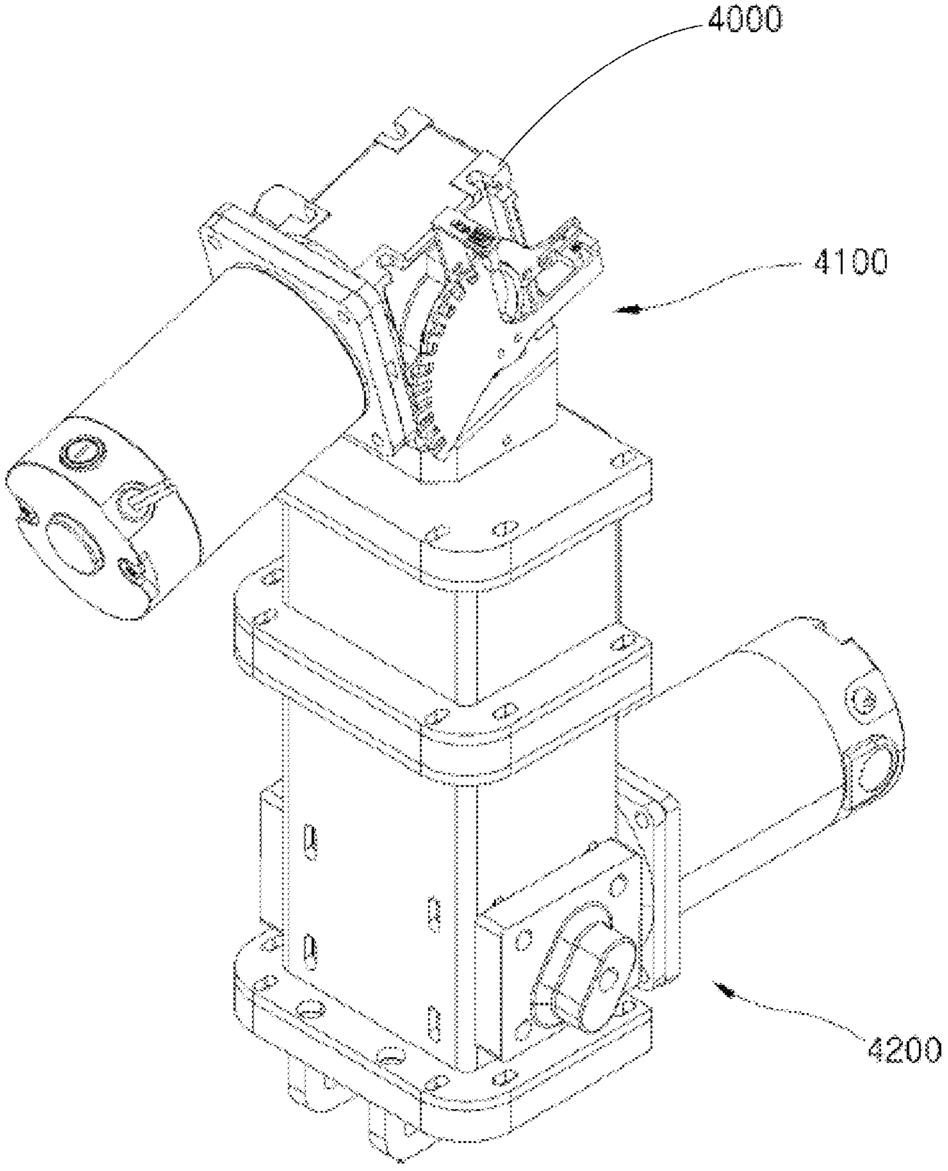
FIG. 9 is a view illustrating the rotation module of FIG. 4.

FIG. 9 is a view illustrating the rotation module 4000 of FIG. 4.

Referring to FIG. 9, the massage device 100 according to an embodiment of the present invention may further include a rotation module 4000 for rotating the arm massage unit 3000 in at least one direction.

In an embodiment, the rotation module 4000 may include a first rotation module 4100 rotating the arm massage unit 3000 in a vertical direction based on FIG. 9, and a second rotation module 4200 rotating the arm massage unit 3000 in the horizontal direction. In this instance, the first rotation module 4100 and the second rotation module 4200 may be driven based on a motor.

Figure 10:
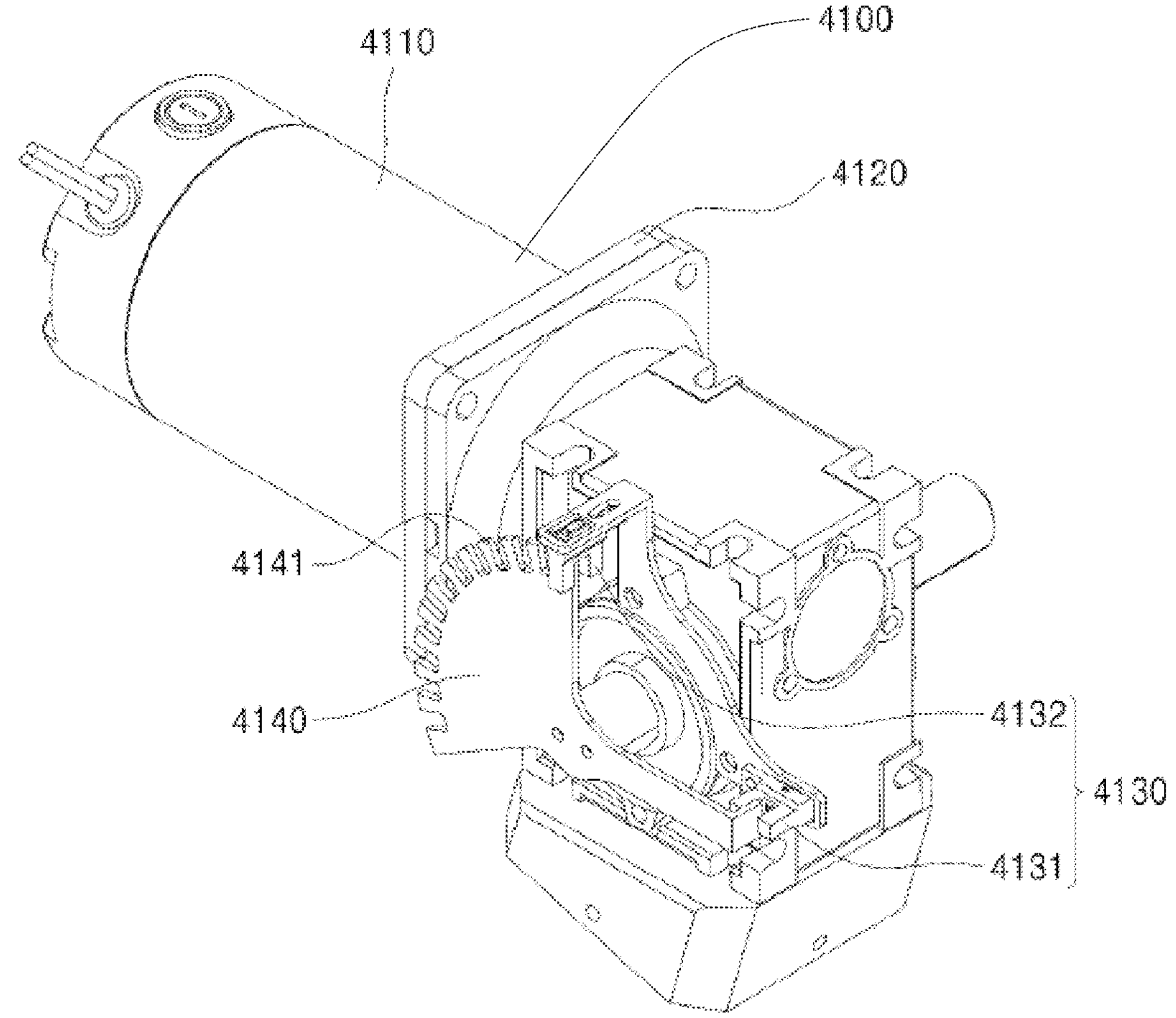
FIG. 10 is a view illustrating a first rotation module of FIG. 9.

FIG. 10 is a view illustrating the first rotation module 4100 of FIG. 9.

Referring to FIG. 10, the first rotation module 4100 may include a first motor 4110 for rotating the arm massage unit 3000 in the vertical direction and a first decelerator 4120 for reinforcing output of the first motor 4110 and preventing reverse rotation.

The first motor 4110 may be a means for generating a driving force for rotating the arm massage unit 3000 in the vertical direction. For example, the first motor 4110 may generate a driving force, and the generated driving force may be transmitted to the arm massage unit 3000 by a power transmission means.

The first decelerator 4120 may be a means for reinforcing the output of the first motor 4110 and preventing reverse rotation of the arm massage unit 3000. For example, the first decelerator 4120 may reinforce the output generated from the first motor 4110 to stably rotate the arm massage unit 3000. In addition, the first decelerator 4120 may prevent the arm massage unit 3000 from reversely rotating, thereby preventing the arm massage unit 3000 from injuring the user's arm.

The first rotation module 4100 may further include at least one sensor.

In an embodiment, the first rotation module 4100 may include a first rotation sensor 4130 for measuring the degree of vertical rotation of the arm massage unit 3000.

Specifically, the first rotation module 4100 may include a first starting point sensor 4131 for sensing a basic position of a vertical rotation of the arm massage unit 3000 and a first precision rotation sensor 4132 for precisely measuring the degree of rotation of the arm massage unit 3000.

The first starting point sensor 4131 may be a means for sensing the basic position in the vertical direction of the arm massage unit 3000. For example, the first starting point sensor 4131 may sense whether the arm massage unit 3000 is located at the starting point, and the control unit 1200 may control the degree of rotation of the arm massage unit 3000 based on the sensed result.

As an alternative embodiment, the first starting point sensor 4131 may be a photo sensor, but is not limited thereto.

The first precise rotation sensor 4132 may be a means for precisely measuring the degree of rotation in the vertical direction of the arm massage unit 3000. Accordingly, the first rotation module 4100 may further include a first rotation sensing member 4140.

The first precision rotation sensor 4132 may be formed in a "E" shape to have a space therein, and the first rotation sensing member 4140 may pass through the space provided inside the first precision rotation sensor 4132.

The first rotation sensing member 4140 may include at least one first sensing slot 4141 formed along the circumference thereof. Accordingly, as the arm massage unit 3000 rotates, the first rotation sensing member 4140 may rotate together, and the first sensing slot 4141 may sequentially pass through the space provided inside the first precision rotation sensor 4132. Accordingly, the first precise rotation sensor 4132 may precisely measure how much the arm massage unit 3000 was rotated in the vertical direction. In this instance, the first precision rotation sensor 4132 may be a photo sensor, but is not necessarily limited thereto.

Figure 11:
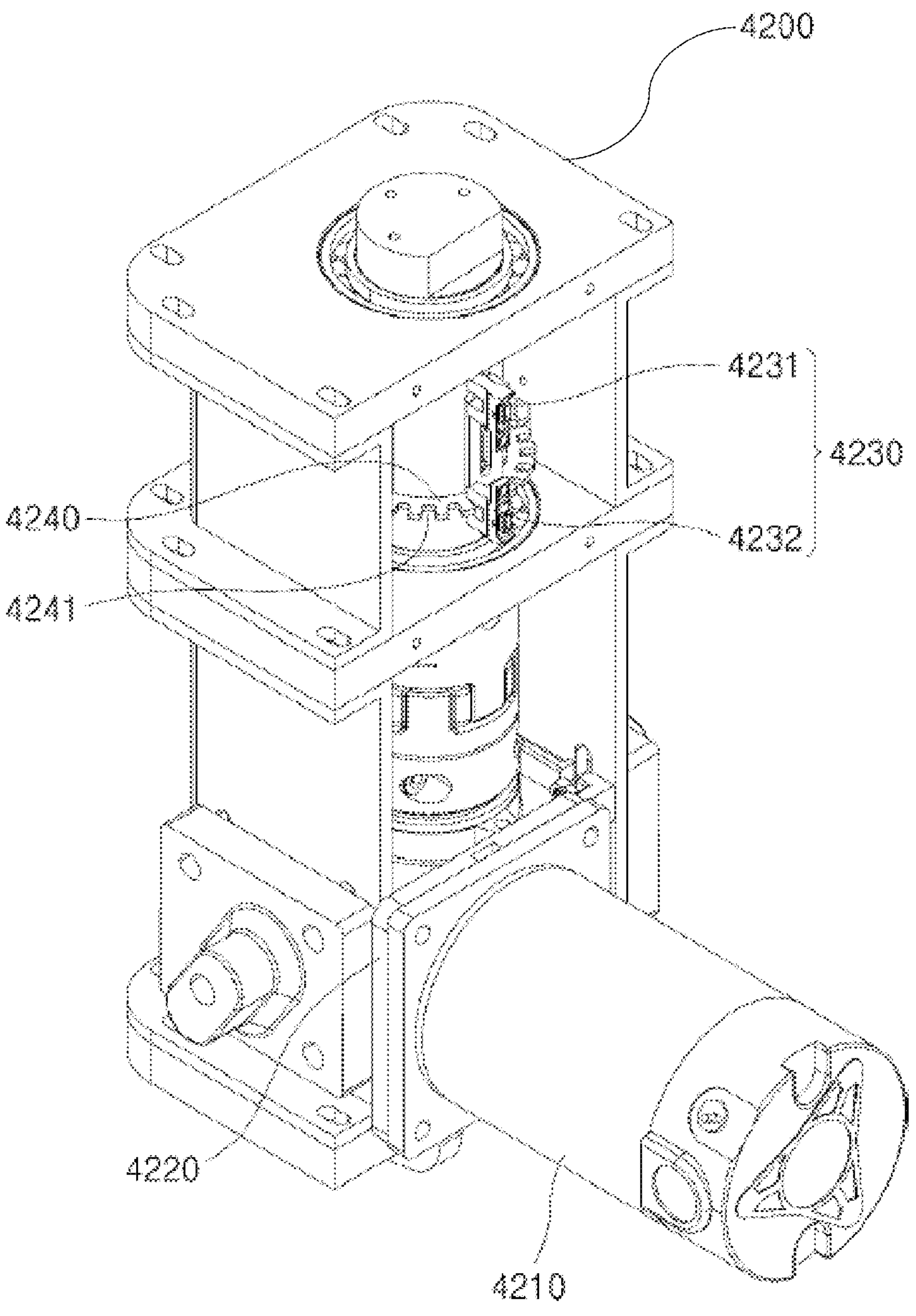
FIG. 11 is a view illustrating a second rotation module of FIG. 9.

FIG. 11 is a view illustrating a second rotation module 4200 of FIG. 9.

Referring to FIG. 11, the second rotation module 4200 may include a second motor 4210 for rotating the arm massage unit 3000 in the horizontal direction, and a second decelerator 4220 for reinforcing output of the second motor 4210 and preventing reverse rotation.

The second motor 4210 may be a means for generating a driving force to rotate the arm massage unit 3000 in the horizontal direction. For example, the second motor 4210 may generate a driving force, and the generated driving force may be transmitted to the arm massage unit 3000 by a power transmission means.

The second decelerator 4220 may be a means for reinforcing the output of the second motor 4210 and preventing reverse rotation of the arm massage unit 3000. For example, the second decelerator 4220 may reinforce the output generated from the second motor 4210 to stably rotate the arm massage unit 3000. In addition, the second decelerator 4220 may prevent the arm massage unit 3000 from reversely rotating, thereby preventing the arm massage unit 3000 from injuring the user's arm.

The second rotation module 4200 may further include at least one sensor.

In an embodiment, the second rotation module 4200 may include a second rotation sensor 4230 for measuring the degree of horizontal rotation of the arm massage unit 3000.

Specifically, the second rotation module 4200 may include a second starting point sensor 4231 for sensing a basic position of a horizontal rotation of the arm massage unit 3000 and a second precision rotation sensor 4232 for precisely measuring the degree of rotation of the arm massage unit 3000.

The second starting point sensor 4231 may be a means for sensing the basic position in the horizontal direction of the arm massage unit 3000. For example, the second starting point sensor 4231 may sense whether the arm massage unit 3000 is located at the starting point, and the control unit 1200 may control the degree of rotation of the arm massage unit 3000 based on the sensed result.

As an alternative embodiment, the second starting point sensor 4231 may be a photo sensor, but is not limited thereto.

The second precise rotation sensor 4232 may be a means for precisely measuring the degree of rotation in the horizontal direction of the arm massage unit 3000. Accordingly, the second rotation module 4200 may further include a second rotation sensing member 4240.

The second precision rotation sensor 4232 may be formed in a "⊏" shape to have a space therein, and the second rotation sensing member 4240 may pass through the space provided inside the second precision rotation sensor 4232.

The second rotation sensing member 4240 may include at least one second sensing slot 4241 formed along the circumference thereof. Accordingly, as the arm massage unit 3000 rotates, the second rotation sensing member 4240 may rotate together, and the second sensing slot 4241 may sequentially pass through the space provided inside the second precision rotation sensor 4232. Accordingly, the second precise rotation sensor 4232 may precisely measure how much the arm massage unit 3000 was rotated in the horizontal direction. In this instance, the second precision rotation sensor 4232 may be a photo sensor, but is not necessarily limited thereto.

Figure 12:
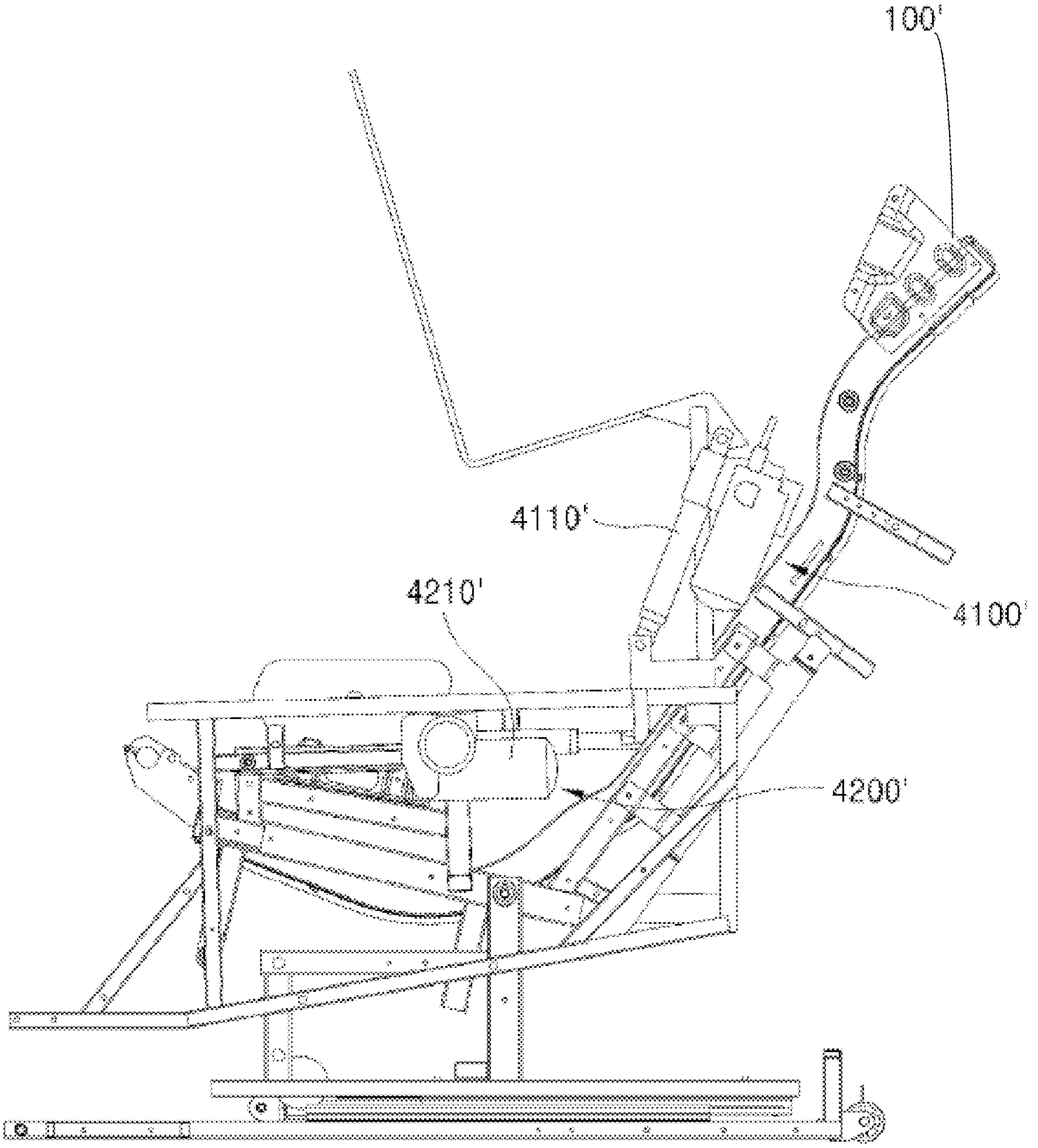
FIG. 12 is a view illustrating another example in which an arm frame and a rotation module are disposed in the main frame of FIG. 2.

FIG. 12 is a view illustrating another example in which an arm frame 1130 and a rotation module 4000 are provided in the main frame 1100 of FIG. 2.

The massage device 100 according to the present embodiment may include an actuator as a driving means for rotating the arm massage unit 3000 in the vertical direction and in the horizontal direction. Hereinafter, with reference to FIGS. 4 to 11, differences between the present embodiment and the above-mentioned embodiments will be described, and the same or similar features will be omitted or briefly described.

Referring to FIG. 12, the massage device 100 according to the present embodiment may include a rotation module 4000 for rotating the arm massage unit 3000.

In this instance, the rotation module 4000 may include a first rotation module 4100 for rotating the arm massage unit 3000 in the vertical direction and a second rotation module 4200 for rotating the arm massage unit 3000 in the horizontal direction.

The first rotation module 4100 may include a first actuator for rotating the arm massage unit 3000 in the vertical direction. For example, the first actuator may generate a driving force for rotating the arm massage unit 3000 in the vertical direction, and the generated force may be transmitted to the arm massage unit 3000 by a power transmission means.

The second rotation module 4200 may include a second actuator for rotating the arm massage unit 3000 in the horizontal direction. For example, the second actuator may generate a driving force for rotating the arm massage unit 3000 in the horizontal direction, and the generated force may be transmitted to the arm massage unit 3000 by a power transmission means.

Figure 13:
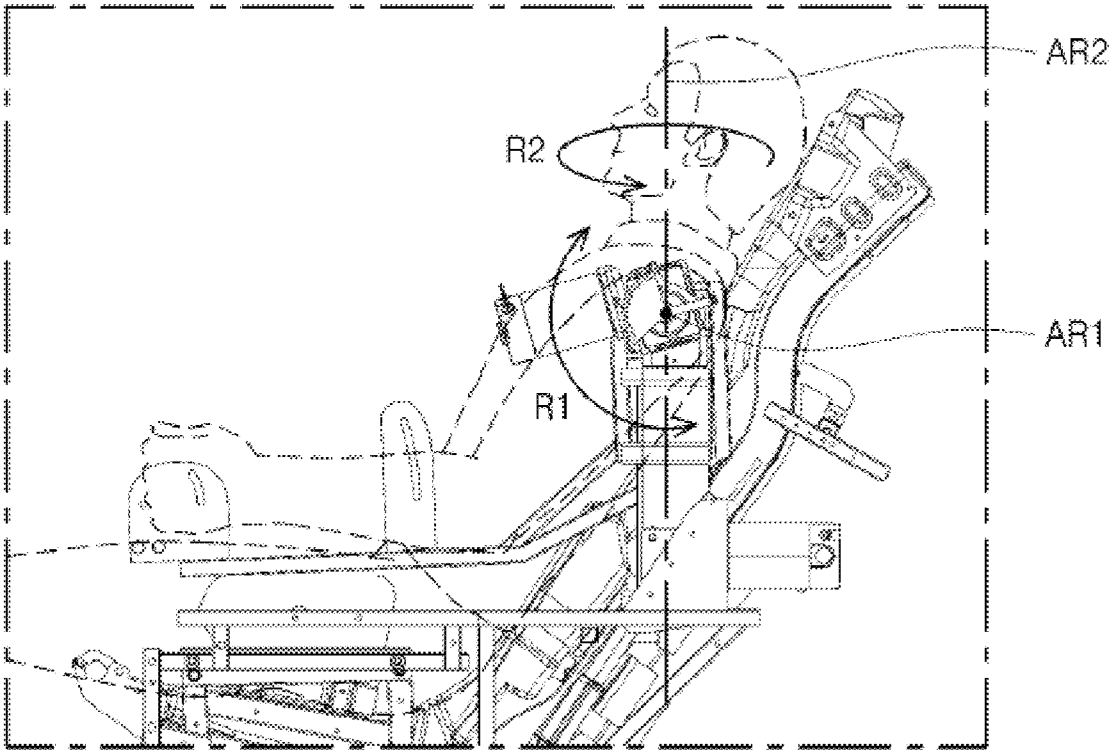
FIG. 13 is a view for depicting a rotary axis of the rotation module.

FIG. 13 is a view for depicting a rotary axis of the rotation module 4000.

The arm of the human body is rotated around the shoulder. Accordingly, even when the arm massage portion 3000 rotates in the vertical direction R1 or in the horizontal direction R2, the arm massage unit 3000 should be rotated around the shoulder of the user.

Referring to FIG. 13, in a case in which the user sits on the massage seat, the user's arm may rotate in the vertical direction R1 with respect to a first axis AR1 located at a position corresponding to the user's shoulder. In addition, in a case in which the user sits on the massage seat, the user's arm may rotate in the horizontal direction R2 with respect to a second axis AR2 located at a position corresponding to the user's shoulder. Accordingly, even when the arm massage unit 3000 rotates, the arm massage unit 3000 should rotate like the user's arm.

That is, in a case in which the arm massage unit 3000 rotates in the vertical direction R1, the rotary axis of the vertical direction R1 may be the first axis AR1, and in a case in which the arm massage unit 3000 rotates in the horizontal direction R2, the rotary axis of the horizontal direction R2 may be the second axis AR2. Alternatively, in a case in which the rotary axis of the arm massage unit 3000 is formed at a position spaced apart from the user's shoulder, rotation of the user's arm may not be easily performed, and thus the rotation of the arm may not be smoothly performed or may cause injury to the user's shoulder or arm.

Figure 14:
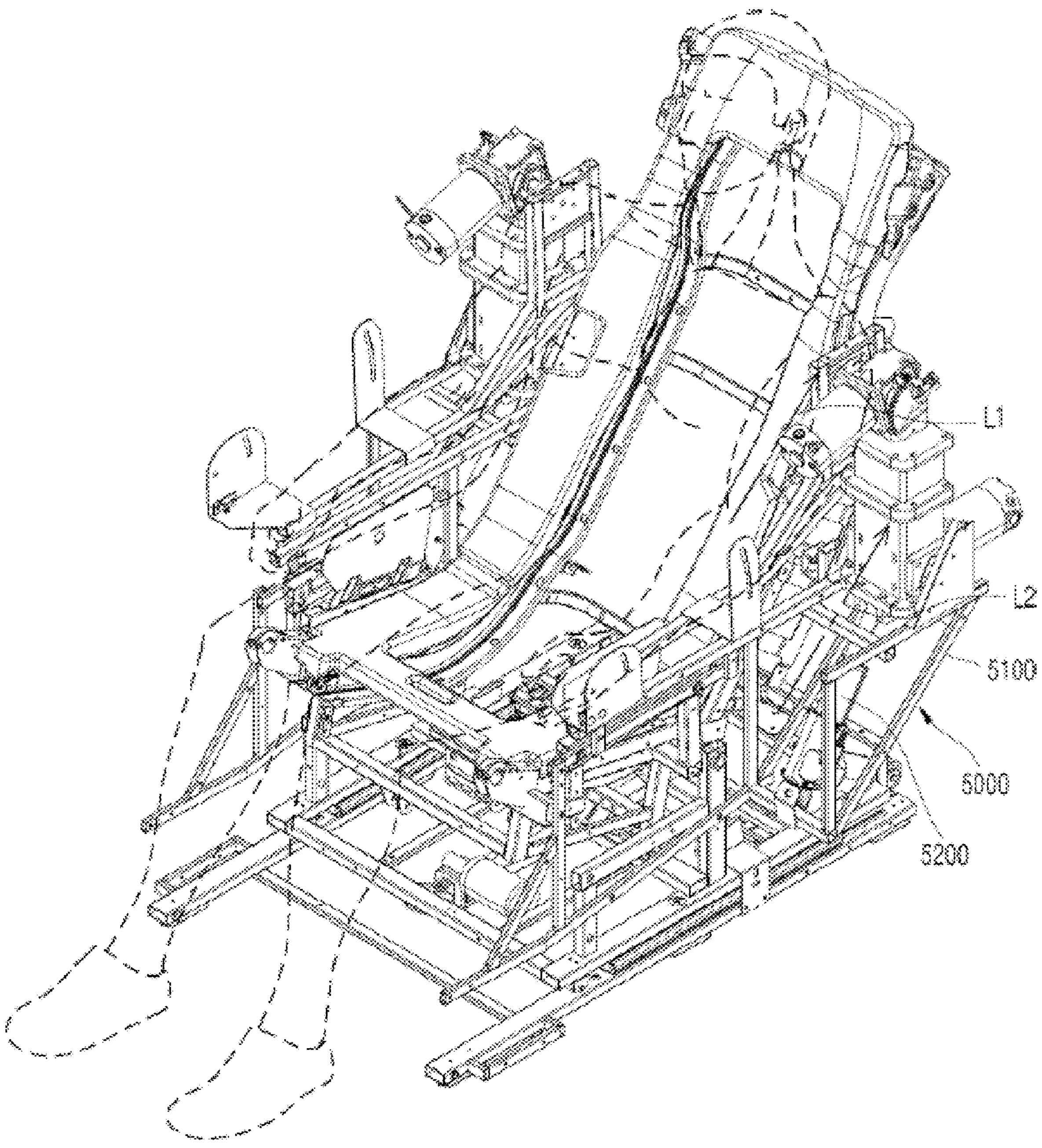
FIG. 14 is a view for depicting a height adjustment module.

FIG. 14 is a view illustrating a height adjustment module 5000.

Referring to FIG. 14, the massage device 100 according to an embodiment of the present invention may further include a height adjustment module 5000 for adjusting the height of the rotation module 4000.

As described above, the rotary axis of the arm massage unit 3000 should be located at a position corresponding to the user's shoulder. For example, a virtual intersection of the first axis AR1 and the second axis AR2 should correspond to the user's shoulder.

However, various users may use the massage seat, and users have different physical conditions. For example, when each user sits on the massage seat, there is a difference in position where the users' shoulders are located. Therefore, in a case in which a user sits on the massage seat, it is necessary to adjust the position of the rotation module 4000 to correspond to the position of the shoulder of the user, and for example, the height of the rotation module 4000 needs to be adjusted.

The height adjustment module 5000 may be a means provided in the massage device 100 to adjust the height of the rotation module 4000. For example, the height adjustment module 5000 may adjust the height of the rotation module 4000 to adjust the vertical rotary axis and the horizontal rotary axis of the arm massage unit 3000 to correspond to the user's shoulder.

As an embodiment, the height adjustment module 5000 may include a height adjustment frame 5100 connected to the body massage unit 1000 and a height adjustment actuator 5200 connected to the rotation module 4000 to adjust the height of the rotation module 4000.

The height adjustment frame 5100 may be a means connected to one side of the body massage unit 1000 to fix the height adjustment module 5000 to the massage device 100.

In addition, the rotation module 4000 may be connected to one side of the height adjustment frame 5100 to guide the movement direction of the rotation module 4000.

The height adjustment actuator 5200 may be a means connected to the rotation module 4000 to generate a driving force for moving the rotation module 4000. For example, the height adjustment actuator 5200 may be a linear actuator.

However, the present invention is not limited thereto, and a motor may be used instead of the actuator to provide a driving force for moving the rotation module 4000.

In an embodiment, the height adjustment module 5000 may move the rotation module 4000 in a direction parallel to the longitudinal direction ranging from the user's shoulder to the user's elbow. That is, with reference to FIG. 14, while the user sits in the massage device 100, a virtual line L1 extending from the user's shoulder to the user's elbow and a virtual line L2 extending from the movement path of the rotation module 4000 may be parallel to each other.

If the movement direction of the rotation module 4000 and the longitudinal direction ranging from the user's shoulder to the user's elbow are not parallel to each other, the vertical rotary axis and the horizontal rotary axis of the arm massage unit 3000 are dislocated. Accordingly, it may lay a burden on the user's arm or cause an injury on the user's arm.

Accordingly, as described above, the rotation module 4000 moves in parallel with the longitudinal direction ranging from the user's shoulder to the user's elbow so as to adjust the position of the rotation module 4000 corresponding to the user's body.

As an alternative embodiment, in order to guide the movement direction of the rotation module 4000, the height adjustment frame 5100 may be provided with a guide member for guiding the movement direction of the rotation module 4000, and the rotation module 4000 may further include a moving member engaged with the guide member to move along the guide member.

Although the embodiments of the present invention have been described in more detail with reference to the accompanying drawings, the present invention is not necessarily limited to such embodiments, and may be variously modified without departing from the spirit of the present invention. Therefore, these embodiments as described above are only proposed for illustrative purposes and do not limit the present invention. The scope of protection of the present invention should be interpreted by the claims, and all technical ideas within the scope equivalent thereto should be construed as being included in the scope of the present invention.

The invention claimed is:

1. A massage device comprising:
- a body massage unit for accommodating at least a portion of the body of a user to massage the user's body;
- a pair of arm massage units which are respectively arranged at both sides of the body massage unit and respectively accommodate both arms of the user to massage the user's arms; and
- a pair of rotation modules for rotating the respective arm massage units in at least one direction,
- wherein the body massage unit includes a main frame including arm frames to which the arm massage units are respectively connected,
- wherein each of the arm massage units is rotatable in at least one direction,
- wherein the pair of rotation modules comprises a first rotation module for rotating the arm massage unit in a vertical direction, and
- wherein the first rotation module comprises a first rotation sensor for measuring the degree of vertical rotation of the arm massage unit.

2. The massage device according to claim 1, wherein the pair of rotation modules comprises a second rotation module for rotating the arm massage unit in at least one direction.

3. The massage device according to claim 2, wherein the second rotation module comprises a second rotation sensor for measuring the degree of horizontal rotation of the arm massage unit.

4. The massage device according to claim 1, wherein the massage device further comprises a height adjustment module for adjusting a height of the rotation module.

5. The massage device according to claim 4, wherein the height adjustment module adapted to move the rotation module in a direction parallel to the longitudinal direction ranging from the user's shoulder to the user's elbow.

6. The massage device according to claim 1, wherein the pair of rotation modules are respectively disposed at both sides of the body massage unit to correspond to the pair of arm massage units.

7. The massage device according to claim 6, wherein the pair of rotation modules move independently of each other.

* * * * *